United States Patent [19]
Girardier

[11] 3,967,450
[45] July 6, 1976

[54] POWER-GENERATION SYSTEM COMPRISING AN ENGINE ACTUATED BY THE EXPANSION OF A LIQUEFIABLE GASEOUS FLUID

[75] Inventor: Jean-Pierre Girardier, Montargis, France

[73] Assignee: Sofretes-Societe Francaise d'Etudes Thermiques et d'Energie Solaire, France

[22] Filed: May 28, 1974

[21] Appl. No.: 474,090

[30] Foreign Application Priority Data
June 14, 1973  France .............................. 73.21679

[52] U.S. Cl. .................................... 60/657; 60/671
[51] Int. Cl.² ........................................ F01K 25/08
[58] Field of Search ...................... 60/657, 651, 671

[56] References Cited
UNITED STATES PATENTS

| | | |
|---|---|---|
| 3,292,366 | 12/1966 | Rice et al. .............................. 60/651 |
| 3,462,951 | 8/1969 | Moore .................................. 60/657 |
| 3,584,457 | 6/1971 | Davoud ............................. 60/671 X |
| 3,603,087 | 9/1971 | Burkland .............................. 60/671 |
| 3,834,166 | 9/1974 | Cupper et al. ......................... 60/651 |

*Primary Examiner*—Allen M. Ostrager
*Attorney, Agent, or Firm*—Young & Thompson

[57] ABSTRACT

The power-generation system comprises an engine actuated by the expansion of a liquefiable gaseous fluid within a chamber which undergoes a cyclic variation in volume, an evaporator supplied from a hot source such as a solar or geothermal heat collector and a condenser associated with a cold source. A driving fluid which is vaporized under pressure in the evaporator is employed at least partly for lubrication of the engine, the liquid elements entrained by the vaporized fluid being collected by means of a separator and conveyed to the engine casing through a drawing-off line.

1 Claim, 5 Drawing Figures

POWER-GENERATION SYSTEM COMPRISING AN ENGINE ACTUATED BY THE EXPANSION OF A LIQUEFIABLE GASEOUS FLUID

This invention relates to a power-generation system comprising an engine actuated by the expansion of a liquefiable gaseous fluid. The invention applies in particular to systems of this type which operate with a fairly low temperature gradient between the hot and cold sources.

It has already been proposed in the prior art to make use of these systems, especially for installations consisting of solar engines or pumps of the type described, for example, in French patent No. 1,485,515. These engines usually comprise a piston moving within a cylinder which is secured to a casing and supplied with fluid which has been vaporized under pressure in an evaporator, said evaporator being heated by means of a solar-radiation collector panel. The expanded fluid from the engine is fed to a condenser associated with a cold source. The condensed fluid returns under pressure to the evaporator under the action of a re-injection pump which is usually driven by the engine. The mechanical energy available at the drive shaft of the engine is employed by way of example for the purpose of feeding a water supply system automatically. The water supplied through a suction pump driven by the engine constitutes the cold source which is necessary for the condenser.

Under the conditions which have just been indicated, closed-loop systems for the driving fluid have been devised in which this latter has in particular a base of methylchloride, difluorodichloromethane (Freon 12) or sulphur dioxide ($SO_2$) as proposed in the patent cited above. These installations are employed mainly in areas which are not equipped with technical facilities and in which they are intended to operate automatically and practically without supervision for a number of years.

It is necessary to ensure in these systems that the engine casing can be filled with lubricant once and for all at the time of putting the installation into service. The same applies to the filling of the closed loops which contain the driving fluid.

In point of fact, experience shows that the endurance of these systems is uncertain on account of mechanical incidents which can be attributed to incorrect lubrication of the engines. These incidents tend to become more serious if it is sought to increase the specific power of the system or to extend the duration of operating periods without maintenance.

A study of the damage found to have been sustained in systems of this type shows that the lubricant is often carried away by the driving fluid, thus causing seizures. In other operating circumstances and especially at the time of variations in running speed, the condensed driving fluid tends to accumulate within the engine casing and this also has an adverse effect on the lubrication.

The aim of the invention is to provide a remedy for the incidents mentioned above by simple and economical means while at the same time permitting the construction of power-generation systems which develop appreciably larger power outputs in comparison with known systems.

In accordance with the invention, the power-generation system comprises an engine actuated by the expansion of a liquefiable gaseous fluid expanded within a device providing a cyclic variation in volume and rigidly fixed to a casing of the engine, and an evaporator connected by a heating circuit to a hot source such as a solar or geothermal heat collector, a condenser associated with a cold source, an admission line which connects the engine to a dome for drawing-off the vaporized fluid from the evaporator, a line for the discharge of the expanded fluid which connects the engine to the condenser, said system being characterized in that it contains a driving fluid at least partly utilizable for the lubrication of the engine, and that it comprises a separator placed in the admission line and provided with means for collecting the liquid elements entrained by the vaporized driving fluid, the separator being additionally connected to the engine casing by means of a drawing-off line for the purpose of conveying the liquid elements aforesaid to the engine casing.

By means of the separator which collects the liquid elements entrained by the fluid which has been vaporized within the evaporator and by means of the drawing-off line which passes said elements into the engine casing, a complete drop in liquid level within the casing is accordingly prevented and the necessary lubrication is ensured since the condensed driving fluid has been selected for its lubricating properties.

In a preferred embodiment of the invention, the driving fluid is butane; the lubricant is an oil which is at least partially miscible with the driving fluid; the separator comprises a closed vessel for collecting the liquid elements and heating means associated with the heating circuit of the evaporator; the engine casing is connected to the condenser by means of an overflow line.

Further properties and advantages of the invention will be brought out by the description of a preferred embodiment of the invention which is given hereinafter by way of non-limitative example, reference being made to the accompanying drawings, wherein.

Figure 1:
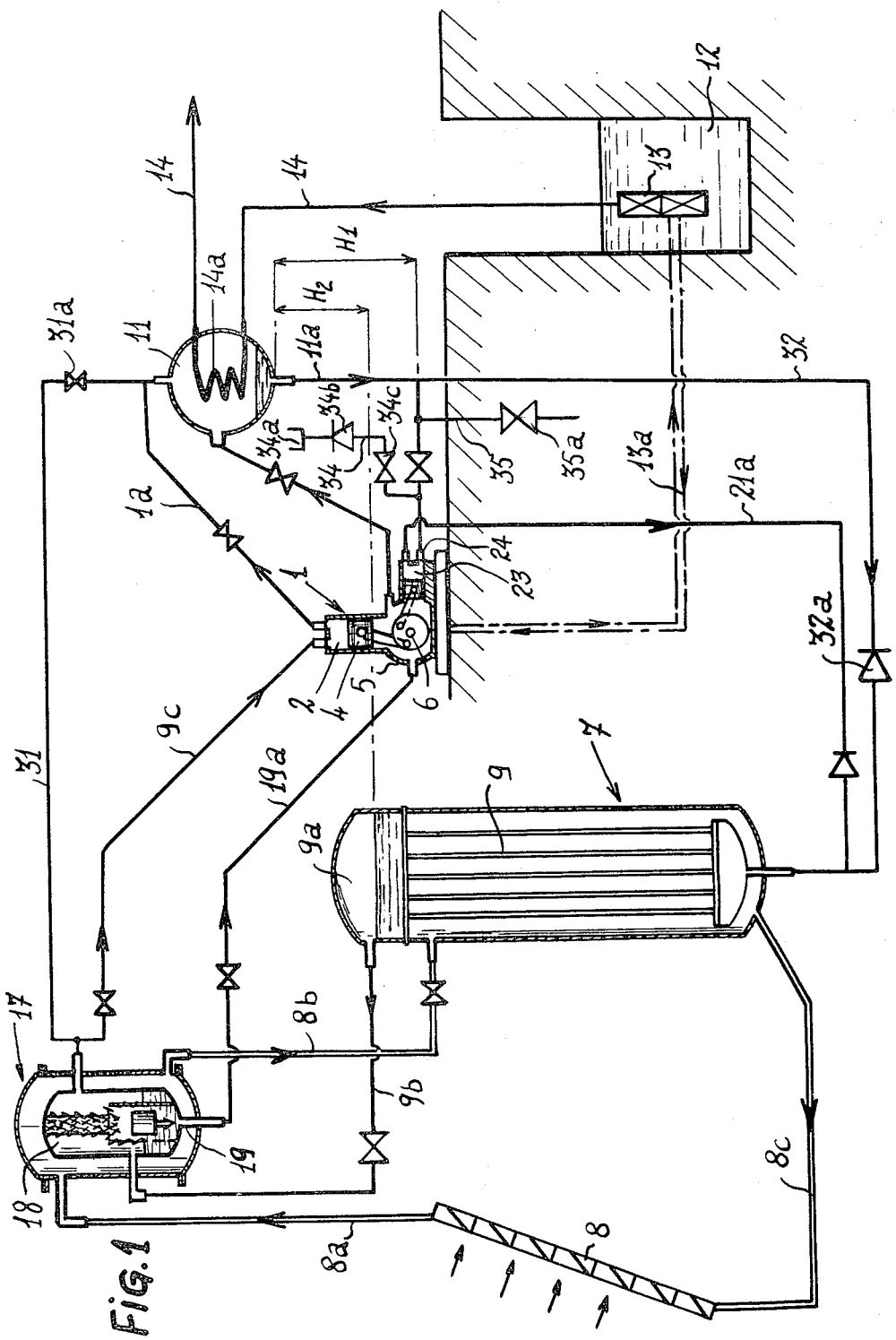
FIG. 1 is a general diagram of a power-generation system in accordance with the invention.
Figure 3:
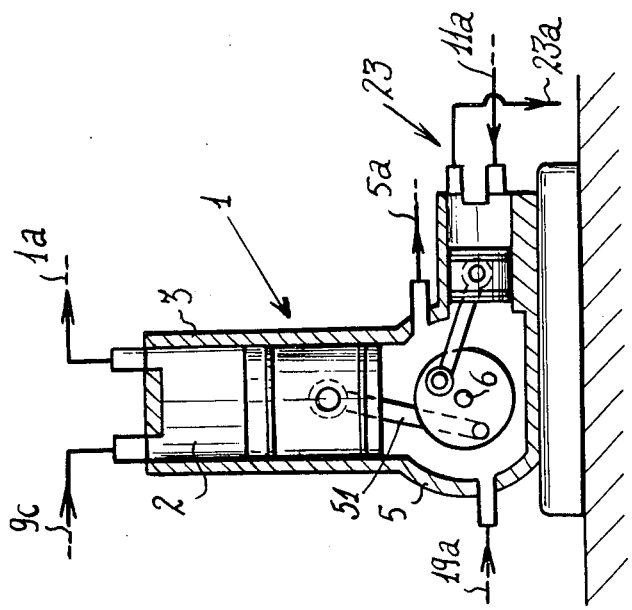
FIG. 3 is a diagrammatic sectional view in elevation of the engine of the system shown in FIG. 1.
Figure 2:
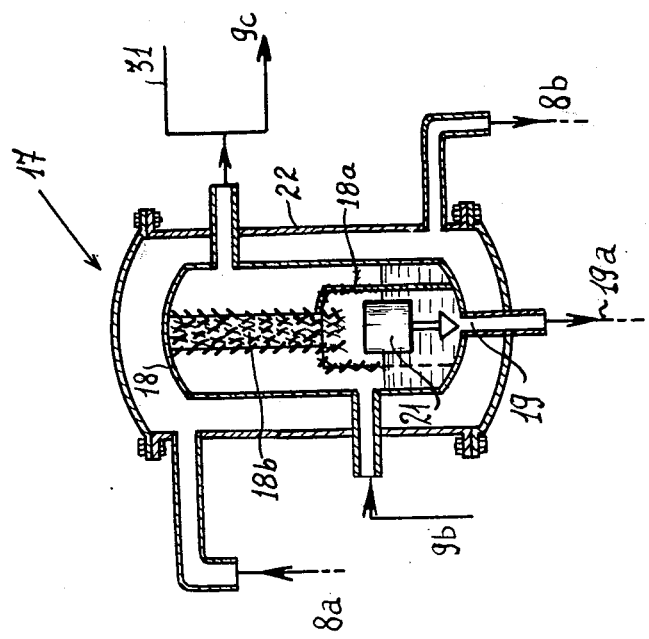
FIG. 2 is a diagrammatic sectional view in elevation of the separator shown in FIG. 1.

In the embodiment which is illustrated in FIGS. 1 to 3, the power-generation system comprises an engine 1 actuated by the expansion of a liquefiable gaseous fluid expanded within a work chamber 2 contained in a cylinder 3. A piston 4 produces a cyclic variation in the volume of the work chamber 2 by means of a connecting-rod 51 associated with a crank-plate rotatably mounted on a leak-tight casing 5 on which the cylinder 3 is fixed. A drive shaft 6 is rigidly fixed to the crank-plate.

In the embodiment under consideration, it is assumed that the drive system utilizes solar radiation as a primary source of energy. To this end, the driving fluid is vaporized under pressure within an evaporator 7 connected to a solar radiation collector panel 8 by means of hot-water lines 8a, 8b, 8c disposed in a circulation loop in order to effect the heating of a tube nest 9 which contains the condensed driving fluid. The top portion of the tube nest 9 has a collecting dome 9a which is connected to the engine 1 by means of a line for the admission of vaporized fluid under pressure. Said admission line is constituted by two consecutive sections 9b, 9c.

After expansion within the engine 1, the expanded fluid is conveyed through a discharge line 1a to a condenser 11 associated with a cold source constituted by a well 12. A pump 13 discharges the water from the well 12 into a water supply line 14 through a cooling coil 14a which is disposed within the condenser 11. The pump 13 is driven by the engine 1 by means of a hydraulic system comprising two lines 13a (as shown in FIG. 1).

In accordance with the invention, the power-generation system aforesaid contains a driving fluid which is intended to be employed for the lubrication of the engine and consists of butane. By "butane" is meant in this description not only pure hydrocarbon but also the mixtures of hydrocarbons which are usually delivered by industrial manufacturers under this commercial designation. Methyl chloride can also be employed as driving fluid and provides results which are similar to butane.

In regard to the use of lubricant for the engine, the system contains an oil which is at least partially miscible with the driving fluid. The miscibility of the oil and of the driving fluid is limited to a proportion by weight of approximately 30% of driving fluid in the mixture in the case of a temperature of the order of 40°.

Figure 4:
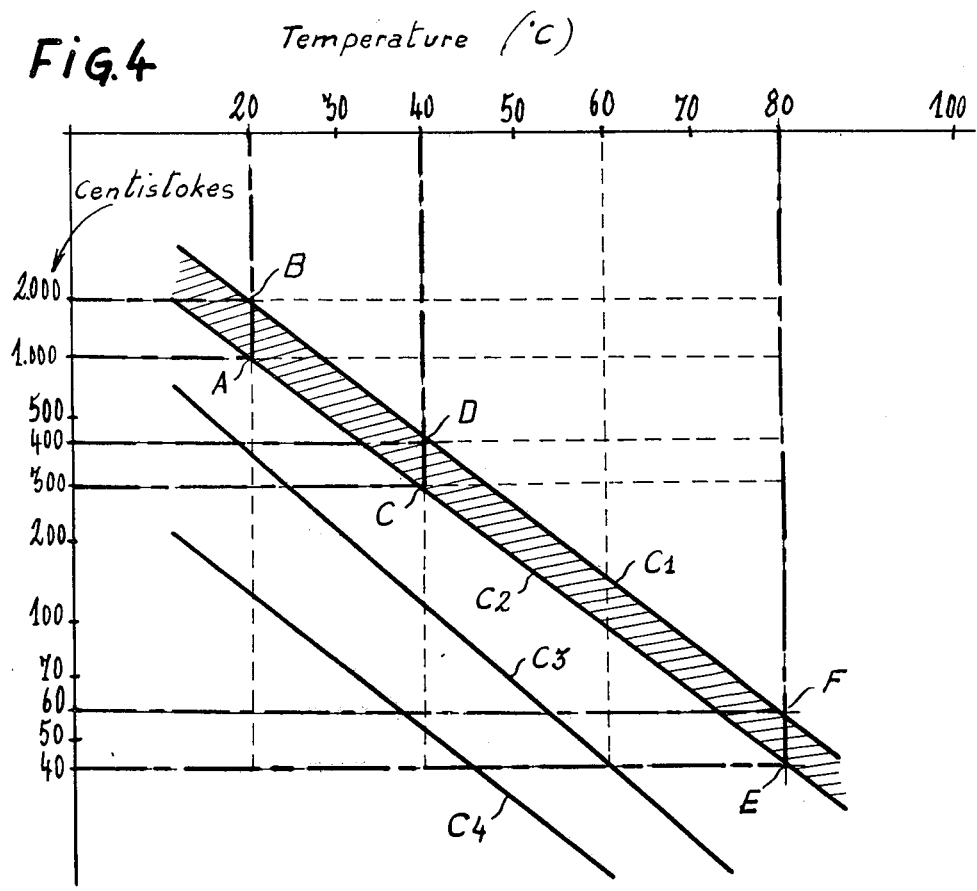
FIG. 4 is a graph indicating the essential properties of the oil which is provided for the operation of the system shown in FIG. 1.

The kinematic viscosity of the oil in the pure state (see FIG. 4) is of the order of 1000 to 2000 centistokes at a temperature of 20°C, of the order of 300 to 400 centistokes at 40°C and 40 to 60 centistokes at 80°C. The kinematic viscosity of the mixture of oil and driving fluid is of the order of 10 to 25 centistokes at a temperature of 40°C.

The oil employed is treated by means of an anti-emulsion agent which prevents the formation of foams. Said oil can advantageously contain various known additives in order to ensure long-term maintenance of its lubricating properties while preventing the formation of acid derivatives which would be detrimental to the good quality of mechanisms and seals and at the same time preventing the appearance of gums or various deposits which would impair the cleanliness of the circulation systems and of the engine casing.

The condensed fluid contained in the tube nest 9 and the dome 9a of the evaporator advantageously consists of a proportion by weight of oil within the range of 5 to 10% (see FIG. 1).

Provision is made in the admission line 9b, 9c for a separator 17 (as shown in FIGS. 1 and 2) comprising a leak-tight vessel 18 formed of two portions separated by baffle-type partition-walls 18a and by elements 18b which are permeable to the gaseous fluid but designed to absorb the liquid elements brought in the form of droplets or mist by the gaseous fluid supplied from the drawing-off dome 9a of the evaporator 7. The absorbing elements 18b are constituted for example by pads of stainless steel turnings held in position by means of perforated walls which are similar to the baffle-type walls 18a.

The two portions of the vessel 18 each communicate respectively with one section 9b, 9c of the admission line. The vessel 18 of the separator is provided at the lower end in the service position with an outlet 19 which can be obturated by means of a float valve 21; said valve is capable of opening the outlet 19 each time the level of liquid collected in the vessel 18 reaches a predetermined height of a few centimeters, for example. The obturatable outlet 19 is connected to one end of a drawing-off line 19a, the other end of which communicates with the enclosure formed by the casing 5 of the engine 1 (as shown in FIGS. 1 and 3).

The vessel 18 of the separator 17 comprises heating means constituted by a jacket 22 (as shown in FIG. 2) which communicates with the hot water supply lines 8a, 8b of the heating circuit of the evaporator 7.

The engine casing 5 is connected to the condenser 11 (as shown in FIGS. 1 and 3) by means of an overflow line 5a. The condenser is also connected by means of a return line 11a to a re-injection pump 23 which is driven by the engine 1 and ensures that the driving fluid condensed within the condenser 11 is returned under pressure towards the evaporator 7.

In the service position, the base of the condenser 11 is raised to a height H1 (as shown in FIG. 1) with respect to the suction valve 24 of the re-injection pump 23. The height H1 is of the order of at least 1 meter, for example. The return line 11a which terminates at the suction valve 24 of the re-injection pump has a constant slope which prevents any appearance of bubbles by virtue of the hydrostatic pressure resulting from the height H1 aforesaid. For reasons of simplicity, said constant slope has not been shown in the diagram of FIG. 1.

The base of the condenser 11 is also raised in the service position to a height H2 with respect to the normal level of the liquid within the drawing-off dome 9a of the evaporator 7. This higher level is defined by the outlet orifice of the admission line 9b which connects the dome 9a to the separator 17. The height H2 is at least 50 cm, for example.

In order to facilitate the operation of the system which has just been described and especially by reason of the non-continuous solar radiation to which the heating panel 8 is exposed as will be explained hereinafter, a direct line 31 (shown in FIG. 1) connects the drawing-off dome 9a to the condenser 11 without passing through the engine 1. The direct line 31 is fitted with a valve 31a which can be operated by hand and is maintained in the closed position for the operation of the engine.

Similarly, another direct line 32 connects the base of the condenser 11 to the base of the tube nest 9 of the evaporator 7 without passing through the re-injection pump 25. The line 32 is fitted with a non-return valve 32a which permits the flow of the fluid only in the direction indicated, namely from the condenser 11 towards the evaporator 7.

For the purpose of preparing and filling the fluid-circuits of the system, the line 11a between the condenser 11 and the suction valve 24 of the re-injection pump 23 comprises a filling branch line 34 located in proximity to the suction valve 22 and a draining-off branch line 35 separated and the filling branch line 34 by a shut-off valve which is maintained in the open position for the operation of the engine.

The filling branch line 34 is fitted with a leak-tight connection 34a, a non-return valve 34b and a shut-off valve 34c which is maintained in the closed position for the operation of the engine. The draining-off branch line 35 is fitted with a shut-off valve 35a which is maintained in the closed position under the same conditions.

At various points of the fluid-circuits and of the elements which have just been described, the installation is completed by shut-off valves, non-return valves and filters (not shown in the drawings) which make it possible to ensure operation of the system over a long period of time. Finally, the operation can be controlled under predetermined conditions by means of level tubes, pressure gauges and thermometers.

Prior to start-up of the system, the casing 5 of the engine 1 is topped-off with oil. Thorough cleaning is then carried out by means of dry hot air which is blown-in through the connection 34a while operating the engine 1 and the re-injection pump by hand. By means of the draining-off branch line, a cleaning stream is allowed to pass through the lines and elements which are intended to contain the driving fluid. A stream of nitrogen at moderate pressure is then passed through for the purpose of removing the air. In order to check the entire system for leak-tightness it can be ensured that the nitrogen pressure thus established within the fluid-circuits is maintained therein over a long period of time by maintaining the filling and drawing-off valves 34c and 35a in the closed position. The nitrogen under pressure is permitted to escape and the fluid-circuits are connected to a vacuum pump in order that a vacuum of the order of at least 95% may accordingly be created therein prior to filling with driving fluid.

For the purpose of filling with driving fluid, the evaporator 7 is advantageously maintained as cold as possible. To this end, the heating circuit 8a, 8b, 8c is isolated and a stream of cold water derived from the well 12 is circulated within the evaporator, for example, by means of an auxiliary line (not shown for the sake of simplicity of FIG. 1). At a temperature of the evaporator of the order of 30°C, the pressure of filling with butane is approximately 3 bars. The tube nest 9 of the evaporator is thus filled with liquefied butane to a level which is slightly below the outlet orifice of the line 9b.

The aforementioned filling operation is preferably carried out in two stages, the level indicated being reached by means of a complementary dose of oil which is miscible with butane, namely in a proportion of 5 to 10% by weight of oil within the evaporator 7 which has thus been filled. In this manner, a certain quantity of oil is continuously supernatant within the dome 9a.

The system in accordance with the invention which has been described from the point of view of structural design and preparation will now be explained in regard to the particular features of operation.

Figure 5:
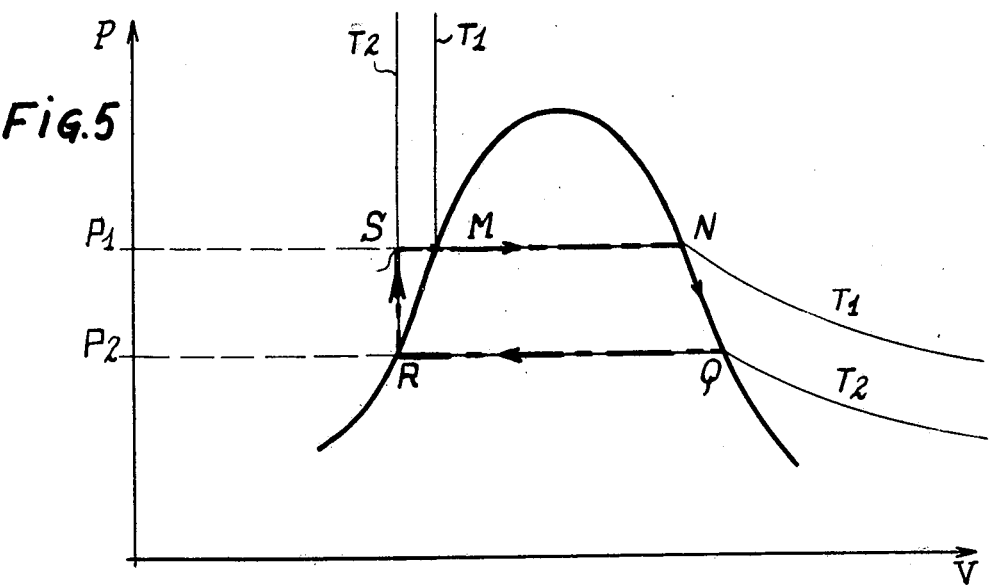
FIG. 5 is a simplified graphical representation of the operating cycle of the system shown in FIG. 1.

When the condensed driving fluid contained in the evaporator 7 (FIG. 1) is subjected to the heating which is produced by the solar radiation collector 8 and which is communicated by the heating lines 8a, 8b, 8c, thereby producing a flow of hot water in a closed circuit, the pressure and the temperature of the driving fluid accordingly increase. In FIG. 5, there is shown in a simplified manner two curves which characterize the changes of state and the variations in pressure and in volume of a given mass of liquefiable driving fluid as considered at the temperature T1 which is close to that of the hot source 8 (FIG. 1) and at the temperature T2, namely the temperature of the condenser 11 which is cooled by the cold source 12. The central curve of the graph of FIG. 5 corresponds to a zone in which a vapor phase and a liquid phase of the driving fluid are coexistent. On the right-hand side of this zone, the driving fluid is entirely vaporized whereas this latter is wholly liquefied on the left-hand side.

As represented diagrammatically, the commencement of heating of the driving fluid contained in the evaporator 1 corresponds substantially to the point R of the graph of FIG. 5. The point H represents the state of the heated fluid at the temperature T1. At the same time, the pressure of said fluid has increased from P2 to P1; its volume has slightly increased by reason of the expansion in the liquid state. The expansion of the fluid within the engine 1 and the introduction of said fluid into the condenser 11 are represented substantially by the path M-N-Q. When reaching the temperature T2 and at the pressure P2 of the condenser, the driving fluid condenses and decreases in volume to a considerable extent (path Q-R). The action of the re-injection pump 23 then corresponds to the path R-S and heating from T2 to T1 takes place during normal operation along the theoretical path S-M. The power which is available as a result of the operating cycle aforementioned is substantially proportional to the surface area of the closed perimeter S-M-N-Q-R.

Boiling of the driving fluid within the drawing-off dome 9a entrains various liquid elements in the form of oil droplets produced by the supernatant deposit within the dome or even in the form of a mist of incompletely vaporized driving fluid. These liquid elements are stopped by the baffle-type partition-walls 18a and the absorbing elements 18b of the separator 17 (as shown in FIGS. 1 and 2) and accumulate in liquid form at the bottom portion of the vessel 18. When the level of the liquid thus collected reaches a predetermined height, the float valve 21 ensures the discharge of the liquid towards the casing 5 of the engine 1 through the drawing-off line 19a.

The jacket 22 is maintained by means of the heating lines 8a, 8b at a temperature which is slightly higher than that of the driving fluid contained in the dome 9a since the evaporator 7 is heated after the separator, with the result that this latter ensures slight superheating of the vaporized fluid which is conducive to higher efficiency of the engine 1. The device thus ensures a very effective separation of the non-vaporizable elements such as the oil droplets which are entrained by the driving fluid.

The oil flow rate which is thus ensured within the casing 5 by means of the separator 17 and the drawing-off line 19a prevents any abnormal drop in oil level within the casing. Moreover, the overflow line 5a which is connected to the condenser prevents any excessive rise in level within the casing 5. Excellent lubrication and long service life of the engine 21 are thus ensured.

Optimum efficiency of the re-injection pump 23 which is driven by the engine 1 is ensured by the height of charge H1 of the base of the condenser 11 with respect to the pump suction valve 24. This arrangement, associated with the constant slope of the line 11a which connects the condenser to the pump, prevents in particular any irregular start-up and any appearance of bubbles or foam in the driving fluid upstream of the pump 23. The anti-emulsion additive in the oil also helps to prevent this disadvantage which would be liable to affect the efficiency and long-term endurance of the system.

In the event of interruption of the heating, for example under the action of a cloud which masks the sun or at nightfall, the difference in temperature and pressure between the evaporator and the condenser tends to decrease to zero and even to be reversed. By virtue of the height of charge H2 of the base of the condenser with respect to the level of the drawing-off dome 9a, abnormal filling of the condenser with condensed driving fluid which would be detrimental to automatic restarting of the system and of the engine 1 is accordingly prevented. The non-return valve 32a of the direct line 32 then makes it possible to maintain normal filling of the evaporator. In the event of stoppage over a long period of time, it is preferable to open the valve 31a of the direct line 31 in order to facilitate normal filling of the evaporator 7 and to prepare a further daily period of operation of the system.

In accordance with the characteristic features mentioned in the foregoing (with reference to FIG. 1), the present Applicant has devised a power-generation system comprising a heat exchanger 7 which is capable of containing approximately 40 kg of liquid butane. The separator 17 was constituted by three units mounted in parallel and having a total capacity of approximately 6 liters. The cylindrical condenser 11 had a capacity of 200 liters. The cylinder capacity of the engine 1 was approximately 1000 cm$^3$ and the casing 5 of the engine had a normal capacity of approximately 8 liters.

The solar-radiation collector panel 8 made it possible to obtain water at a maximum temperature of 73°C through the heating line 8a, the water being returned to the collector panel 8 through the line 8c at a temperature of 67°C. The vaporized butane under a pressure of the order of 12 bars was thus supplied to the engine 1 through the line 9c at an admission temperature of the order of 65°C. Discharge of the butane towards the condenser 11 was carried out through the line 1a at a pressure of 5 bars and at a temperature of about 40°C.

Under these conditions, the pressure within the casing could attain about 6 bars whilst the variations in level did not exceed 2 cm above or below the reference level.

At an operating speed of 300 revolutions per minute, a continuous power of 1.5 HP at the shaft of the engine 1 was measured.

It is readily apparent that the invention is not limited to the embodiment which has been described by way of example and a large number of alternative forms may accordingly be contemplated without thereby departing from the scope or the spirit of the invention.

I claim:

1. In a power generating system operating under a low-gradient thermal cycle, such as in a power plant using solar or geothermal heat, said system comprising a liquefiable driving fluid at least partly usable for lubrication in its liquid form, a low-gradient evaporator associated with a heat source such as a solar or geothermal heat collector, for evaporating said driving fluid, an engine impervious to the surrounding atmosphere and having an inlet connected through an admission line to a drawing-off dome of said evaporator, and actuated by the expansion of said driving fluid within a cyclic-variation volume device attached to a casing of said engine, a condenser associated with a cold source and connected through a discharge line to an exhaust of said engine, a re-injection pump for feeding the driving fluid condensed in the condenser back into the evaporator in a closed circuit, a separator arranged on the admission line to the engine inlet for collecting the liquid elements entrained by the evaporated driving fluid that leaves said evaporator, and a drawing-off line connecting said separator to the engine casing for conveying the liquid elements to the engine casing, said separator being connected to the condenser through an overflow line; the improvement wherein said separator comprises heating means supplied from said heat source of the evaporator, and comprising an inner closed vessel connected to the drawing-off line by means of an obturable outlet, and a floatvalve for temporarily opening said outlet each time the level of liquid collected within the vessel reaches a predetermined height, said heating means comprising a jacket arranged at least partly around said vessel and having an inlet connected to an outlet of the fluid from said heat source of the evaporator, said jacket also having an outlet for said fluid connected to an inlet of the evaporator.

* * * * *